United States Patent
Miyahara et al.

(10) Patent No.: US 6,877,710 B2
(45) Date of Patent: Apr. 12, 2005

(54) POWER UNIT MOUNT STRUCTURE VEHICLES

(75) Inventors: Tetsuya Miyahara, Wako (JP); Shuji Otake, Wako (JP); Nobuo Kubo, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,527

(22) Filed: Sep. 4, 2003

(65) Prior Publication Data

US 2004/0046099 A1 Mar. 11, 2004

(30) Foreign Application Priority Data

Sep. 6, 2002 (JP) .................................... 2002-262092

(51) Int. Cl.[7] ................................................ F16M 1/00
(52) U.S. Cl. ...................... 248/637; 248/672; 248/680; 248/903; 411/536
(58) Field of Search ................................ 248/637, 638, 248/669, 603, 903, 640, 672, 680; 411/535, 536, 544

(56) References Cited

U.S. PATENT DOCUMENTS

| 320,640 A | * | 6/1885 | Davis ......................... 411/536 |
| 3,136,206 A | * | 6/1964 | Adams ....................... 411/546 |
| 5,056,975 A | * | 10/1991 | Ando .......................... 411/155 |
| 5,096,350 A | * | 3/1992 | Peterson ...................... 411/12 |
| 6,152,665 A | * | 11/2000 | Wallace et al. ............... 411/11 |

FOREIGN PATENT DOCUMENTS

JP          10238578 A     9/1998

* cited by examiner

*Primary Examiner*—Korie Chan
(74) *Attorney, Agent, or Firm*—Rankin, Hill, Porter & Clark LLP (57) ABSTRACT

A vehicular power unit mount structure (33) having a first mounting member (51) for attachment to a power unit and a second mounting member (52) elastically connected to the first mounting member for attachment to a vehicle body includes at least one projection (66) protruding from a flange (62) of the second mounting member (52) toward the vehicle body and located at a position offset from a line connecting centers of attachment holes (64, 64) of the flange to ensure that the flange (62) of the second mounting member (52) and the vehicle body are forced together via the projection (66).

5 Claims, 7 Drawing Sheets

FIG. 7A
(COMPARATIVE EXAMPLE)

FIG. 7B
(INVENTION)

FIG. 7C
(INVENTION)

POWER UNIT MOUNT STRUCTURE VEHICLES

FIELD OF THE INVENTION

The present invention relates to an improvement in a power unit mount structure for vehicles.

BACKGROUND OF THE INVENTION

Power unit mount structures for vehicles or vessels designed for attached to a vehicle or vessel body at two portions thereof are known as disclosed, for example, in Japanese Patent Laid-open Publication No. HEI-10-238578.

Figure 9A:
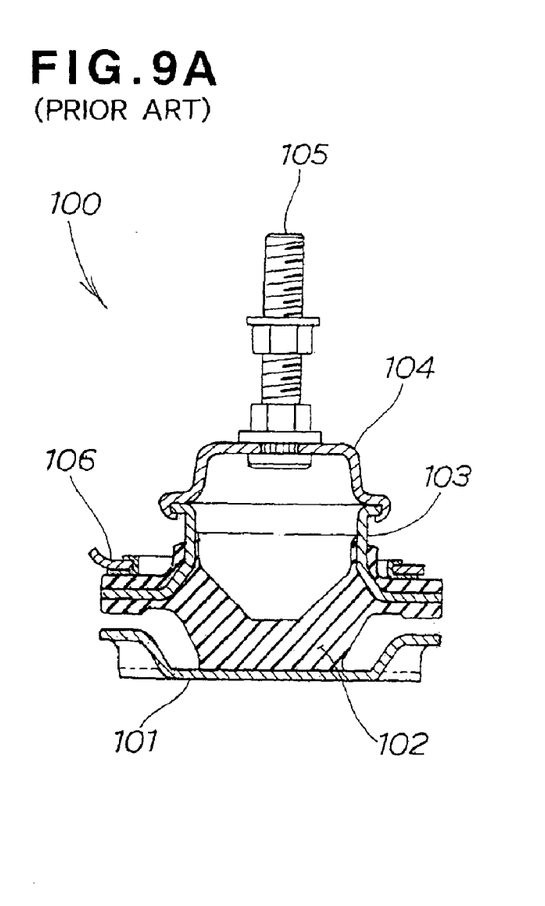
FIG. 9A is a cross-sectional view of a conventional power unit mount structure.
Figure 9B:
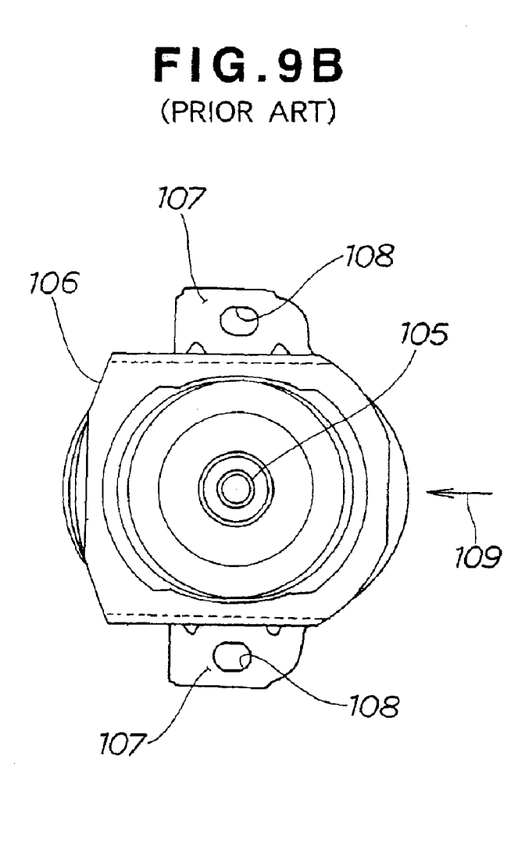
FIG. 9B is a plan view of FIG. 9A.

The disclosed power unit mount structure, as illustrated here in FIGS. 9A and 9B, comprises a vibration isolating device or isolator 100 composed of a lower mounting bracket 101, a mount body 103 carried on the lower mounting bracket 101 via a rubber cushion 102, an upper mounting bracket 104 crimped to an upper end of the mount body 103 and supporting thereon a bolt 105 for attachment to an engine (not shown), and an annular stopper plate 106 serving as a stop against displacement of the mount body 103 in an upward direction.

The annular stopper plate 106, as shown in FIG. 9B, has a pair of L-shaped legs 107, 107 disposed in diametrically opposed relation with each other about an axis of the bolt 105. The legs 107 each have an oblong hole 108 for the passage therethrough of a screw (not shown) used for securing each leg to a vehicle body (not shown). The legs 107 are laid over a pair of mounting flanges (not shown), respectively, of the lower mounting bracket 101 (FIG. 9A), with the oblong holes 108 of the legs 107 held in registry with oblong holes (not shown) formed in the non-illustrated mounting flanges of the lower mounting bracket 101. The legs 107 of the stopper plate 106 and the non-illustrated mounting flanges of the lower mounting bracket 101 are secured by two screws (not shown).

With this arrangement, when vibration isolator 100 is subjected to a force acting in a direction 109 perpendicular to a line passing through centers of the oblong holes 108, 108, the vibration isolator 100 as a whole is likely to tilt and hence becomes unstable because the lower mounting bracket 101 has no mounting flange extending in the same direction 109 as the force applied to the vibration isolator 100.

To deal with this problem, a modification may be considered wherein the lower mounting bracket further has one or two additional mounting flanges extending in a direction perpendicular to the line connecting the centers of the oblong holes 108 of the two existing mounting flanges. The additional mounting flange or flanges have oblong holes for the passage therethrough of screws so that the lower mounting bracket 101 can be secured by the screws to the vehicle body at three or four points. The modification, however, makes the lower mounting flange complicated in configuration and requires a corresponding number of additional screw and threaded hole sets, which incur an additional cost, increase the entire weight of the power unit mount structure, and requires additional space for installation.

SUMMARY OF THE INVENTION

It is accordingly an object of the present invention to provide a power unit mounting structure for vehicles, which is simple in construction, can be manufactured at a relatively low cost, and has improved stability against tilting.

According to the present invention, there is provided a power unit mount structure for a vehicle, comprising a first mounting member for attachment to a power unit, a second mounting member for attachment to a vehicle body, and an elastic connecting member elastically connecting the first and second mounting members. The second mounting member has a flange for abutment with the vehicle body. The flange has two attachment holes for the passage therethrough of two screws to secure the flange to the vehicle body, the two holes being disposed in diametrically opposed relation with each other about a center of the second mounting member. The power unit mount structure further comprises at least one projection protruding from the flange of the second mounting member toward the vehicle body or vice versa and located at a position offset from a line connecting centers of the attachment holes of the flange to ensure that the flange of the second mounting member and the vehicle body are forced together via the projection.

The second mounting member having such projection can withstand a force applied thereto in a direction perpendicular to a line connecting the centers of the attachment holes of the flange. The power unit mount structure as a whole is thus made stable against tilting. The projection can be readily formed at a relatively low cost and obviates the need for an additional wing-like flange to be attached by a screw to the vehicle body which may increase the cost and weight of the entire power unit mount structure.

Preferably, the at least one projection is disposed on a straight line passing through the center of the second mounting member and extending at right angles to the line connecting the centers of the attachment holes. In one preferred form of the invention, the number of the at least one projection is three, the three projections are spaced at equal intervals in a circumferential direction of the flange, and one of the three projections, which is located centrally between two other projections is disposed on the straight line.

BRIEF DESCRIPTION OF THE DRAWINGS

A preferred structural embodiment of the present invention will be described in detail herein below, by way of example only, with the reference to the accompanying drawings, in which.

DETAILED DESCRIPTION OF THE PREFERRED EMBODIMENTS

Figure 1:
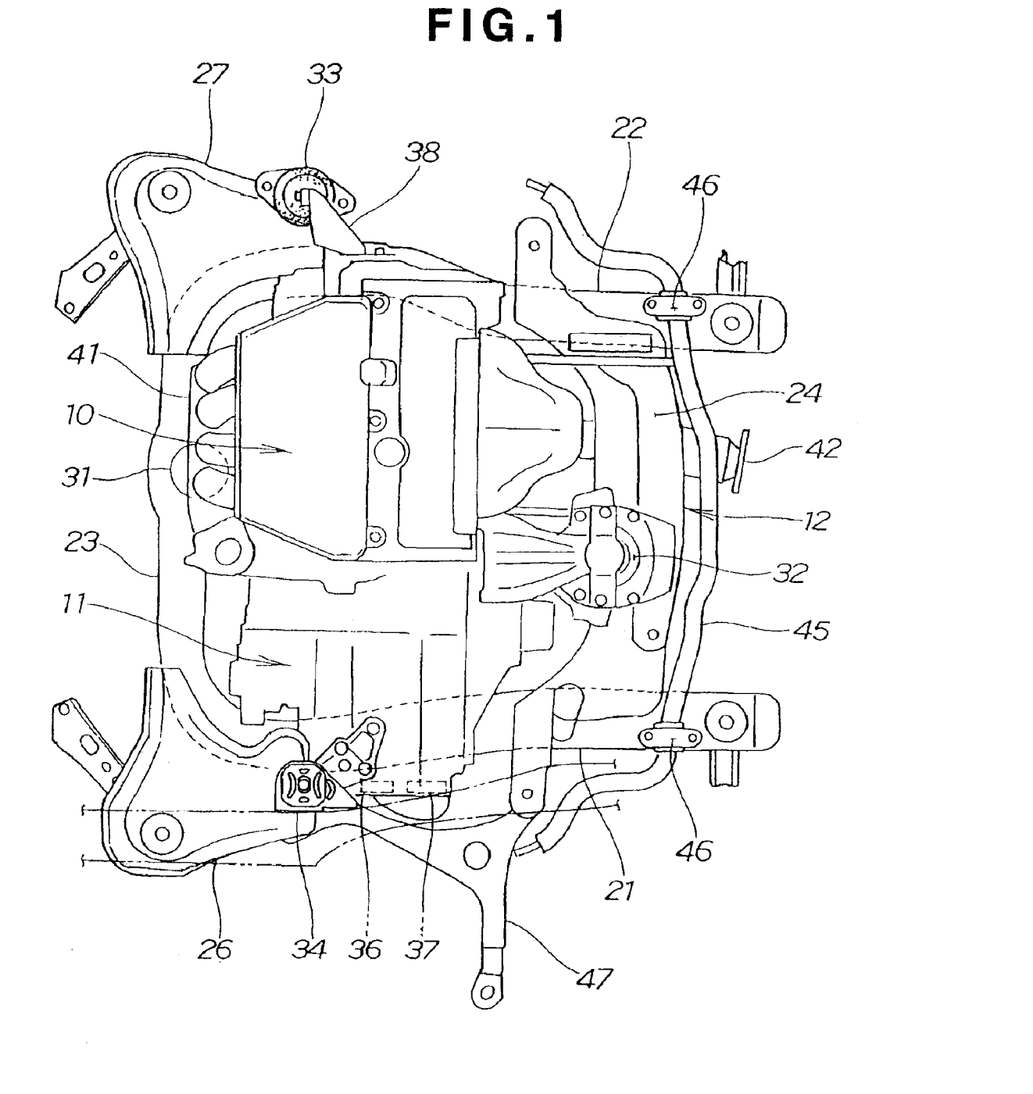
FIG. 1 is a plan view showing the interior of an engine room in which a vehicular power unit is installed using a power unit mount structure according to the present invention.

Referring now to the drawings and FIG. 1 in particular, there is shown in plan view the interior of a vehicular engine room in which a power unit is installed using a power unit mounting structure according to the present invention. The power unit of the vehicle is comprised of a transverse-mounted engine 10. A transmission 11 is assembled integrally with an end of the engine 10. The engine 10 and transmission 11 thus assembled are supported by a sub-frame 12 and non-illustrated right and left front side frames.

The sub-frame 12 is an assembly formed jointly by left and right longitudinal sub-frame members 21 and 22 extending in a longitudinal or front-to-rear direction of the vehicle, front and rear crossbeams 23 and 24 connecting the longitudinal sub-frame members 21, 22 at their front ends and rear ends, respectively, a left plate 26 attached to a joint portion between the left longitudinal sub-frame member 21 and the front crossbeam 23, and a right plate 27 attached to a joint portion between the right longitudinal sub-frame member 22 and the front crossbeam 23. The sub-frame 12 as a whole is mounted on the front side frames, not shown.

To support a power unit assembly composed of the engine 10 and the transmission 11 a plurality of mounts are used. These mounts include a front mount 31 disposed below a substantially central portion of a front part of the power unit assembly, a rear mount 32 disposed below a substantially central portion of a rear part of the power unit assembly, an engine side mount 33 disposed on a side of the engine 10, a transmission upper mount 34 disposed above an end portion of the transmission 11 which is farthest from the engine 10, and transmission lower mounts 36, 37 disposed below the farthest end portion of the transmission 11. The engine side mount 33 constitutes the power unit mount structure according to the present invention. The engine side mount 33 is attached to the engine 10 via a mount bracket 38 on one hand, and attached to the right plate 27 directly on the other. The right plate 27 forms part of a vehicle body.

Reference numeral 41 shown in FIG. 1 denotes an intake manifold of the engine 10. Similarly, numeral 42 denotes an exhaust pipe connected to an exhaust manifold; (not shown) of the engine 10. Numeral 45 denotes a stabilizer, numeral 46 denotes brackets used for attaching the stabilizer 45 to the longitudinal sub-frame members 21, 22, and numeral 47 denotes a suspension arm.

Figure 2:
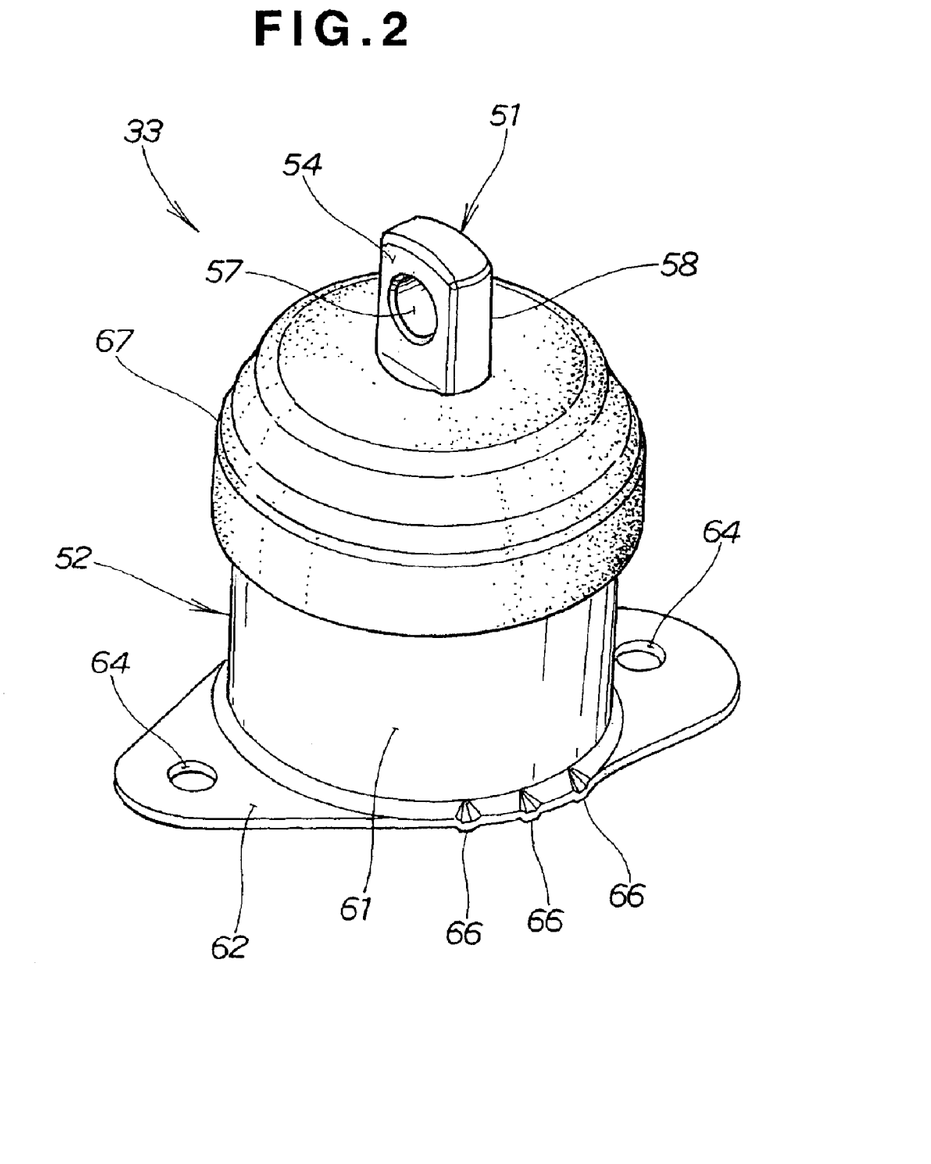
FIG. 2 is a perspective view of an engine side mount constituting part of the power unit mount structure of the present invention.
Figure 3:
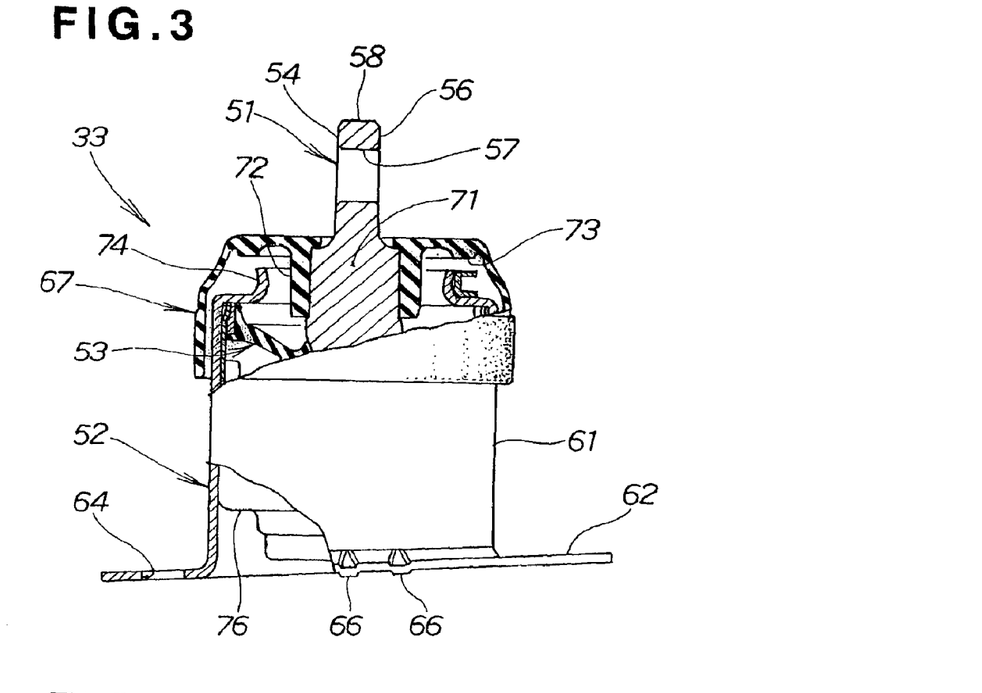
FIG. 3 is a front elevational view, with parts cut away for clarity, of the engine side mount.

As shown in FIG. 2, the engine side mount 33 generally comprises an engine side mounting member (first mounting member) 51 for attachment to the engine 10 (FIG. 1), a body side mounting member (second mounting member) 52 for attachment to the vehicle body (right plate) 27, and an elastic connecting member 53 (FIG. 3A) elastically connecting together the first mounting member 51 and the second mounting member 52. The elastic connecting member 53 is received in the body side mounting member 52.

The engine side mounting member 51 includes a cylindrical shaft portion 58 at an upper end thereof. The shaft portion 58 has two parallel flat surfaces 54 and 56 (FIG. 3) formed in diametrically opposite relation, and a radial through-hole 57 opening at opposite ends to the flat surfaces 54, 56. Though not shown, a screw is inserted through the through-hole 57 to attach the shaft portion 58 to the mount bracket 38 (FIG. 1).

The body side mounting member 52 includes a tubular body 61 having an annular flange 62 at a lower end thereof. The annular flange 62 has a generally oblong or elliptical shape including a circular central portion contiguous with a lower edge of the tubular body 61 and two lateral wings projecting outward from the circular central portion in diametrically opposite directions. The flange 62 has two attachment holes 64, 64 formed in the lateral wings such that the attachment holes 64, 64 are disposed in diametrically opposed relation with each other about a center of the body side mounting member 52 which is corresponding to the axis of the tubular body 61. The flange 62 also has a plurality (three in the illustrated embodiment) of projections 66 protruding in a downward direction. The projections 66 are offset from a line 81 (FIG. 4) connecting centers of the attachment holes 64. When the flange 62 is attached to the right plate 27 (FIG. 1) by means of two screws (not shown), the projections are forced against the right plate 27 to thereby ensure that the body side mounting member 52 can be secured to the right plate 27 with improved stability comparable to the three-point or four-point fixing.

The engine side mount 33 further includes a cover 67 made of elastic material such as rubber. The elastic cover 67 is fitted over the engine side mounting member 51 and an upper part of the body side mounting member 52 with the shaft portion 58 projecting upward from the cover 67, so as to cover a clearance or gap between the engine side mounting member 51 and the body side mounting member 52, thereby making the engine side mount 33 into a waterproof structure.

As shown in FIG. 3, the elastic cover 67 has a central sleeve 72 fitted with a cylindrical body 71 of the engine side mounting member 51, and a downwardly protruding annular land 73 disposed concentrically around the sleeve 72. The sleeve 72 and the annular land 73 are made thicker than the rest of the cover 67. The tubular body 61 of the body side mounting member 52 is reduced in diameter at an upper end so as to form a tubular neck 74. The neck 74 extends around the sleeve 72 of the cover 67 and the body portion 71 of the engine side mounting member 51. The body 71 of the engine side mounting member 51 and the tubular body 61 of the body side mounting member 52 are elastically connected together by means of the elastic connecting member 53. In the illustrated embodiment, the connecting member 53 is made of rubber and held in an inner tube 76 received inside the tubular body 61 of the body side mounting member 52.

Figure 4:
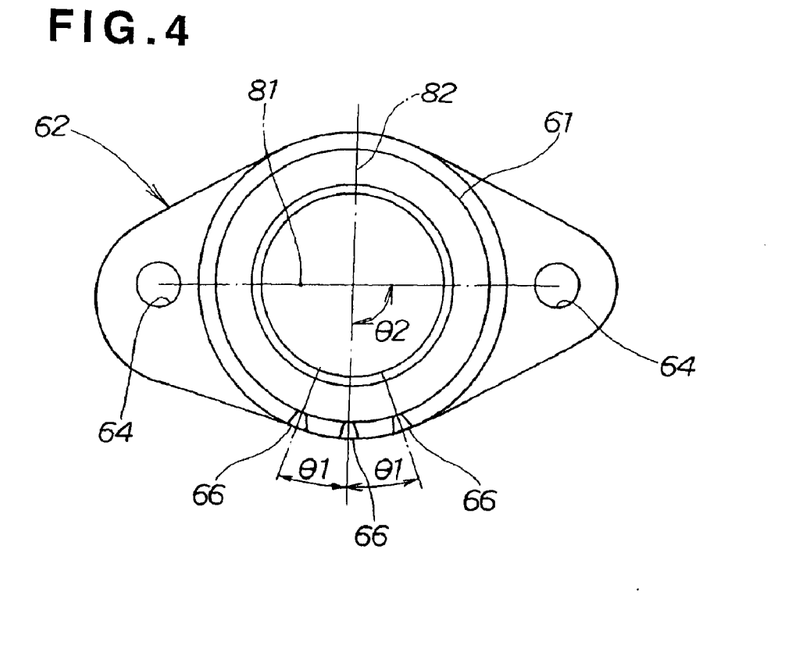
FIG. 4 is a plan view of FIG. 3, with parts omitted for clarity.
Figure 5:
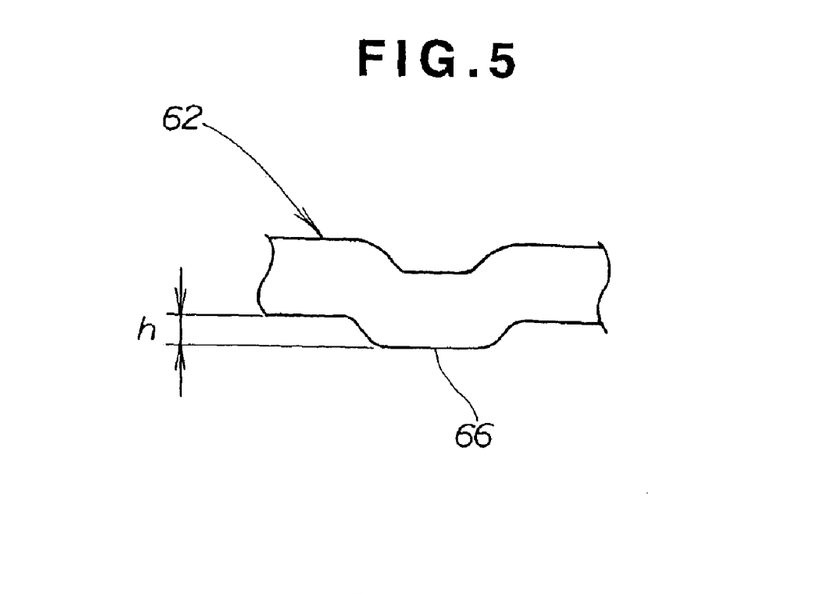
FIG. 5 is an enlarged view showing a projection formed on a flange of the engine side mount.

As clearly shown in FIG. 4, the three projections 66 on the flange 62 are spaced at equal intervals in a circumferential direction of the flange 62 and the central projection 66 is disposed on a line 82 which passes through the center of the body side mounting member 52 (corresponding to the axis of the tubular body 61) and extends substantially at right angles to the line 81 connecting the centers of the attachment holes 64, 64 of the flange 62 ($\theta 2 \approx 90°$). All the projections 66 are formed at one time by a press-forming process and have a height "h", as shown in FIG. 5. By using the press-forming process, the projections 66 can be readily formed in a short time and at a desired position.

Figure 6:
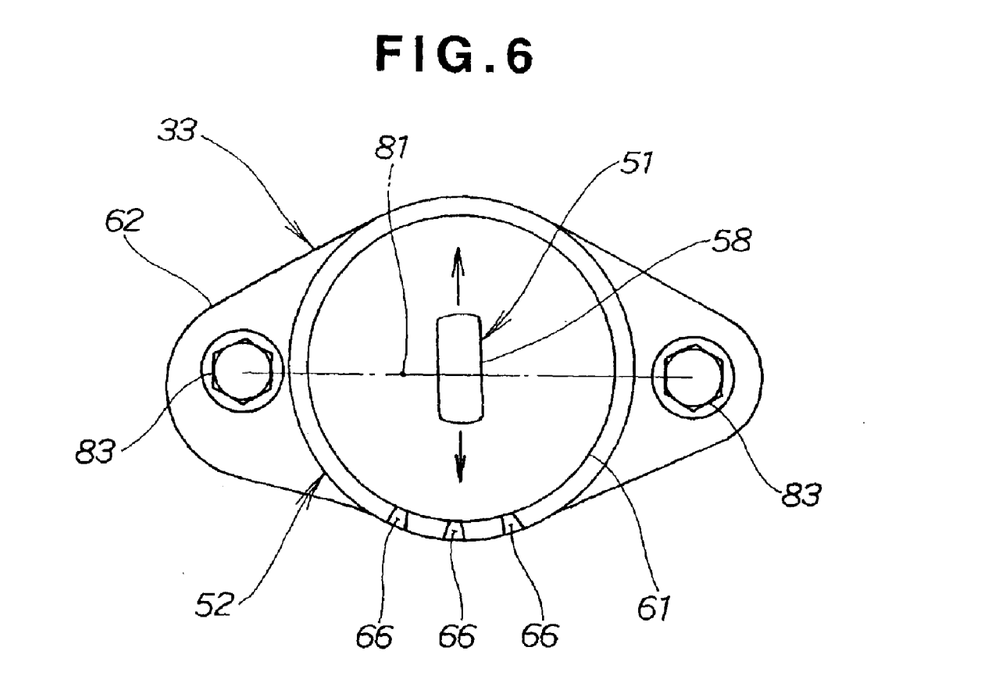
FIG. 6 is a view similar to FIG. 4, but showing the operation of the engine side mount according to the present invention.

Operation of the projections 66 will be described below with reference to FIGS. 6 and 7A–7C. FIG. 6 shows the engine side mount 33 as it is disposed in an operating condition with the body side mounting member 52 attached by two screws 83 to the right plate 27 (FIG. 1) and with the engine side mounting member 51 attached by a non-illustrated screw to the mount bracket 38 (FIG. 1) attached to the engine 11. When the engine 10 tends to displace in a transverse or widthwise direction of the vehicle (i.e., vertical direction in FIG. 1) during use, force acting in the same direction is applied from the engine 10 through the mount bracket 38 to the engine side mount 33. In this instance, the engine side mount 33 is subjected to a force acting in a direction perpendicular to the line 81 connecting centers of heads of the screws 83, 83 (corresponding to the centers of the attachment holes 64 shown in FIG. 4).

Figure 7A:
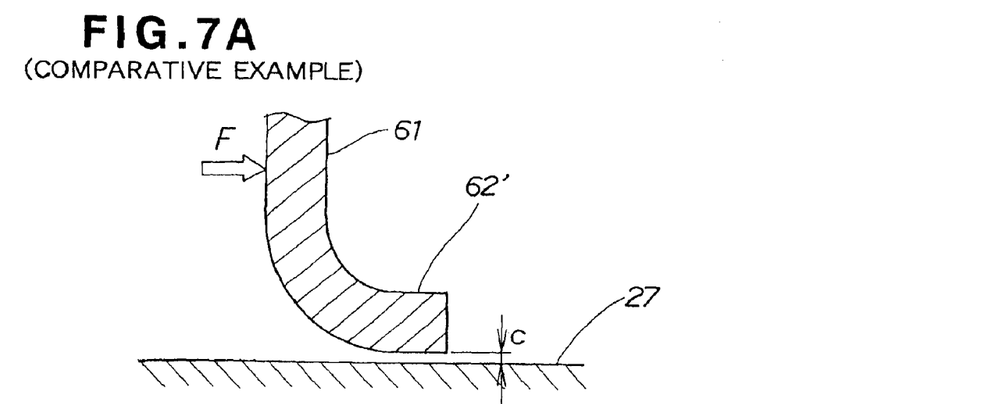
FIG. 7A is an enlarged view illustrative of the operation of a flange free of a projection according to an comparative example.

Under such condition, if the tubular body 61 of the body side mounting member 52 has a flange 62' free from projections, such as shown in FIG. 7A, and there is a space or clearance "c" formed between the flange 62' and the right plate (vehicle body) 27 at a position aligned with the direction of the force F, the tubular body 61 of the vehicle side mounting member 52 is likely to tilt in the direction of the force F, making the engine side mount unstable as a whole.

Figure 7B:
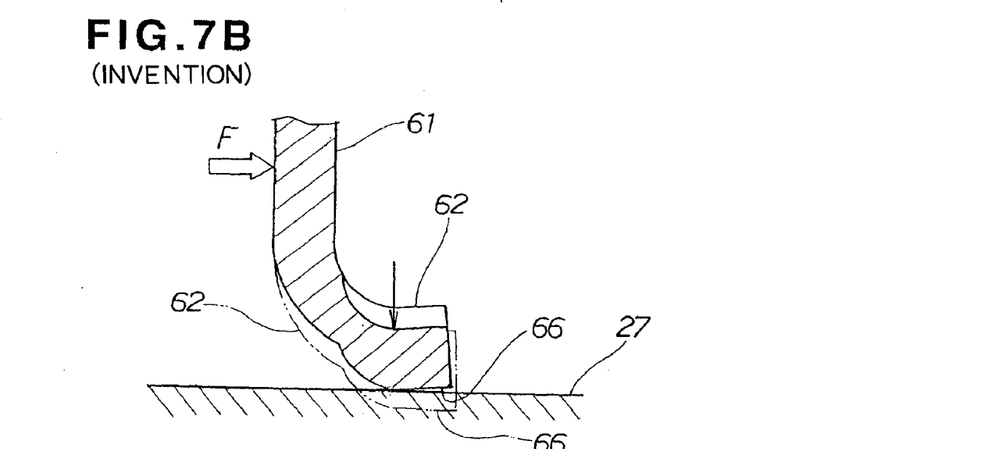
FIG. 7B is an enlarged view illustrative of the operation of the flange having projections according to the invention.

On the other hand, the body side mounting member 52 according to the present invention has at least one downwardly protruding projection 66 formed on the flange 62 of the tubular body 61, as described previously. When the flange 62 is attached by screws to the right plate 27, the projection 62 ensures forced engagement of that portion of the flange 62 including the projection 62 with the right plate 27 via the projection 66, as shown in FIG. 7B. As a result of the forced engagement, the projection-including flange portion is elastically deformed or distorted upward. When the flange 62 is detached from the right plate 27, the projection-including flange portion is allowed to spring back and assume its initial position indicated by the phantom lines shown in FIG. 7B. It will be appreciated that the flange 62 formed with the projection 66 can take up or accommodate a clearance which may be formed between the flange 62 and the right plate 27 due to, for example, irregularities or undulations on a surface of the right plate 27.

Figure 7C:
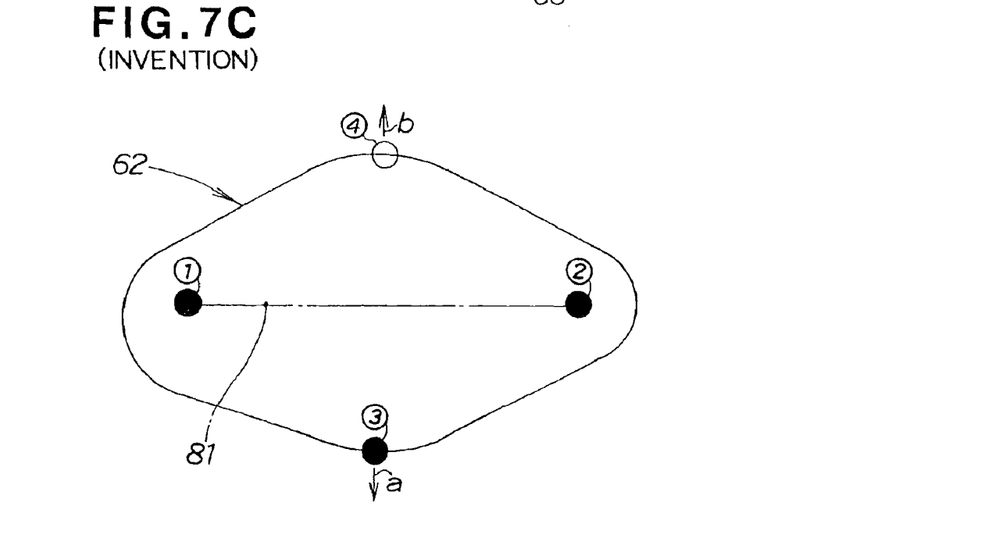
FIG. 7C is a diagrammatical view showing points of engagement between the flange and a vehicle body.
Figure 8:
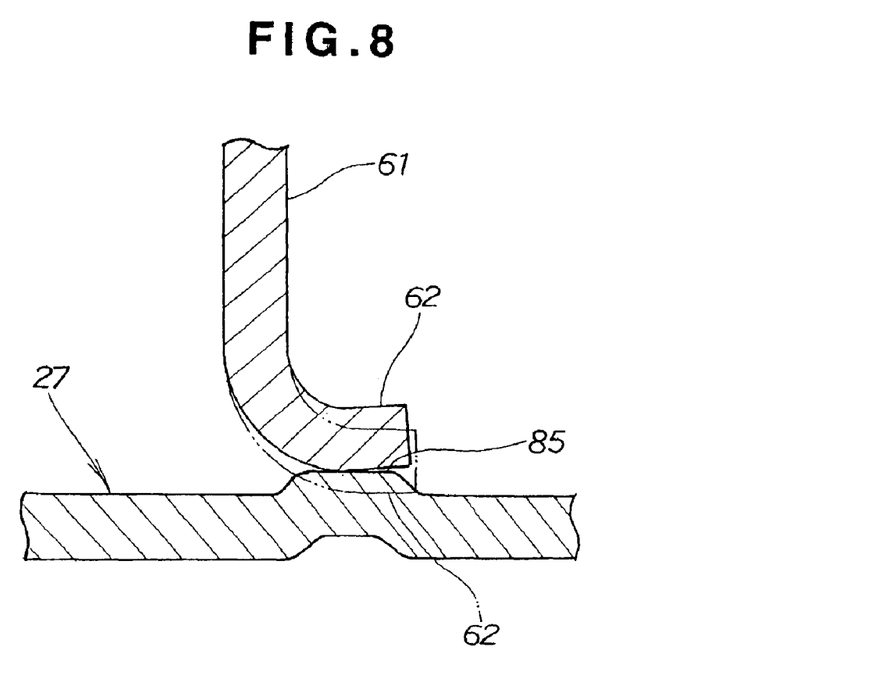
FIG. 8 is a view similar to FIG. 7B, but showing a medication according to the present invention.

The flange 62 thus attached is supported at four points ①, ②, ③ and ④, as diagrammatically shown in FIG. 7C. At the points ①, ② and ③, the flange 62 is firmly anchored or locked in position. More specifically, at the points ① and ②, the flange 62 is firmly connected by the screws 83 (FIG. 6) to the right plate 27 (FIG. 7B). Similarly, at the point ③, the flange 62 is restrained from moving relative to the right plate 27 as it is forced into abutment with the right plate 27 via the projection 66. At the point ④, the flange 62 is not restrained but is in contact with the right plate 27. The support points ①, ② and ③ improve the stability of the engine side mount 33 (FIG. 2) against the force acting in a direction of the arrow "a" shown in FIG. 7C which is perpendicular to the line 81, and the support points ①, ② and ④ improve the stability of the engine side mount 33 against the force acting in a direction of the arrow "b" of FIG. 7C which is also perpendicular to the line 81, FIG. 8 shows a modification according to the present invention wherein a projection 85 is formed on an upper surface of the right plate 27, and a flange 62 of the tubular body 61 of a body side mounting member is free from projection. The position of the projection 85 corresponds to the position of the central projection 66 of the flange 62 shown in FIG. 6. That is, the projection 85 is located at a position offset from the line 81 (FIG. 6) connecting the centers of the heads of the screws 83, 83 (corresponding to the centers of the attachment holes 64 shown in FIG. 4). When the projection-free flange 62 is attached by screws to the right plate 27, a part of the flange 62 corresponding in position to the projection 85 undergoes elastic deformation due to the presence of the projection 85. Thus, the projection 85 ensures that the flange 62 and the right plate (vehicle body) are forced together through the projection 85. By the projection 85, the number of supporting points adds up to three, and a three-point support system thus formed provides increased stability to the engine side mount.

As thus far explained, the vehicular power unit mount structure 33 according to the present invention includes an engine side mounting member (first mounting member) 51 for attachment to an engine or power unit 10, a body side mounting member (second mounting member) 52 for attachment to a right plate 27 forming part of a vehicle body, and an elastic connecting member 53 elastically connecting the engine side mounting member 51 and the body side mounting member 52. The body side mounting member 52 has a flange 62 for abutment with the right plate (vehicle body) 27. The flange 62 has two attachment holes 64 and 64 for the passage therethrough of two screws to secure the flange 62 to the vehicle body 27, the two holes 64 being disposed in diametrically opposed relation with each other about a center of the body side mounting member. The vehicular power unit mounting structure further includes at least one projection 66 or 85 protruding from the flange of the body side mounting member 52 toward the vehicle body 27 or vice versa. The projection 66, 85 is located at a position offset from a line 81 connecting centers of the attachment holes 64, 64 of the flange 62. The projection 66, 85 thus provided ensures that the flange 62 of the body side mounting member 52 and the vehicle body 27 are forced together via the projection 66, 85. By the projection 66, 85 a single independent support point for the flange 62 is formed, which is combined with two other support points formed on the flange 62 by means of the screws 83, thereby completing a three-point support system.

With this arrangement, when a force is transmitted from the engine 10 successively through the engine side mounting member 51 and the elastic connecting member 53 to the body side mounting member 52 and this force acts on the body side mounting member 52 in a direction perpendicular to the line 81 passing through the centers of the attachment holes 64 of the flange 62, the projection 66, 85 retains most parts of the force to thereby keep the body side mounting member 52 stable in position against tilting.

The projection 66, 85 is simple in configuration, can be produced easily at a relatively low cost, and obviates the need for an additional wing-like projection to be attached to the vehicle body by means of a screw which may increase the weight and cost of the power unit mount structure and require a large space for installation.

The projection 66, 85 may be provided on opposite sides of the center of the body side mounting member 52.

What is claimed is:

1. A power unit mount structure for a vehicle, comprising:
 a first mounting member (51) for attachment to a power unit;
 a second mounting member (52) for attachment to a vehicle body (27), the second mounting member (52) having a flange (62) for abutment with the vehicle body (27), the flange (62) having a circular central portion and two attachment holes (64, 64) for the passage therethrough of two screws to secure the flange (62) to the vehicle body (27), the two holes (64) being disposed outside of said circular central portion in diametrically opposed relation with each other about a center of the second mounting member (52);
 an elastic connecting member (53) elastically connecting the first and second mounting members (51, 52); and
 at least one projection (66; 85) protruding from the circular central portion flange (62) of the second mounting member (52) toward the vehicle body (27) or from the vehicle body to the circular central portion of the flange and located at a position offset from a line (81) connecting centers of the attachment holes (64, 64) of the flange (62) to ensure that the flange (62) of the second mounting member (52) and the vehicle body (27) are forced together via the projection (66; 85).

2. A power unit mount structure according to claim 1, wherein the at least one projection (66; 85) is disposed on a straight line (82) passing through the center of the second mounting member (52) and extending at right angles to the line (81) connecting the centers of the attachment holes (64, 64).

3. A power unit mounting structure according to claim 2, wherein the number of the at least one projection is three, the three projections (66) are spaced at equal intervals in a circumferential direction of the flange (62), and one of the three projections which is located centrally between two other projections is disposed on the straight line (82).

4. The power unit mount structure of claim 1, wherein the at least one projection is located at a position offset to a single side of the line (81).

5. The power unit mount structure of claim 2, wherein a second projection is disposed within ten degrees of a projection disposed on a straight line passing through the center of the second mounting member.

* * * * *

UNITED STATES PATENT AND TRADEMARK OFFICE
CERTIFICATE OF CORRECTION

PATENT NO.     : 6,877,710 B2
DATED          : April 12, 2005
INVENTOR(S)    : Tetsuya Miyahara et al.

It is certified that error appears in the above-identified patent and that said Letters Patent is hereby corrected as shown below:

<u>Title page,</u>
Item [54], Title, after "STRUCTURE", insert -- FOR --.

Signed and Sealed this

Sixteenth Day of August, 2005

JON W. DUDAS
*Director of the United States Patent and Trademark Office*